United States Patent [19]

Chang

[11] Patent Number: 5,505,766

[45] Date of Patent: Apr. 9, 1996

[54] METHOD FOR REMOVING POLLUTANTS FROM A COMBUSTOR FLUE GAS AND SYSTEM FOR SAME

[75] Inventor: Ramsay Chang, Los Altos, Calif.

[73] Assignee: Electric Power Research, Inc., Palo Alto, Calif.

[21] Appl. No.: 273,782

[22] Filed: Jul. 12, 1994

[51] Int. Cl.$^6$ .......................... B01D 53/04; B01D 46/04
[52] U.S. Cl. .................. 95/134; 95/58; 95/68; 95/70; 95/148; 95/280; 95/285; 55/262
[58] Field of Search .................. 95/58, 63, 68, 95/70, 90, 107, 133, 134, 141, 142, 148, 280, 285; 96/27, 55, 74, 108, 134, 135; 55/262, 302, 341.1

[56] References Cited

U.S. PATENT DOCUMENTS

| | | | |
|---|---|---|---|
| 2,875,844 | 3/1959 | Pring | 95/141 X |
| 2,875,847 | 3/1959 | Pring | 95/141 |
| 3,798,877 | 3/1974 | Lamb | 95/141 X |
| 3,892,543 | 7/1975 | Margraf | 55/262 X |
| 3,922,210 | 11/1975 | Isfort et al. | 204/99 |
| 3,950,152 | 4/1976 | Guon | 95/285 |
| 3,956,458 | 5/1976 | Anderson | 96/135 X |
| 3,995,005 | 11/1976 | Teller | 55/262 X |
| 4,010,013 | 3/1977 | Murayama | 55/262 X |
| 4,097,251 | 6/1978 | Murayama et al. | 55/262 X |
| 4,101,631 | 7/1978 | Ambrosini et al. | 95/134 X |
| 4,243,635 | 1/1981 | Aeberli | 55/262 X |
| 4,260,399 | 4/1981 | Kawasaki | 95/141 |
| 4,271,134 | 6/1981 | Teller | 55/262 X |
| 4,273,747 | 6/1981 | Rasmussen | 95/134 X |
| 4,319,890 | 3/1982 | Teller et al. | 55/262 X |
| 4,432,776 | 2/1984 | Hölter et al. | 95/107 |
| 4,728,342 | 3/1988 | Åbom | 95/107 |
| 4,889,698 | 12/1989 | Moller et al. | 95/134 X |
| 4,917,862 | 4/1990 | Kraw et al. | 96/134 X |
| 4,919,905 | 4/1990 | Horaguchi et al. | 95/285 X |
| 4,956,162 | 9/1990 | Smith | 423/244 |
| 5,024,681 | 6/1991 | Chang | 55/6 |
| 5,044,286 | 9/1991 | Breen et al. | 110/165 A |
| 5,158,580 | 10/1992 | Chang | 55/6 |
| 5,190,908 | 3/1993 | Audeh et al. | 96/135 X |
| 5,387,406 | 2/1995 | Ruoff | 55/341.1 X |

FOREIGN PATENT DOCUMENTS

| | | | |
|---|---|---|---|
| 2153777 | 5/1973 | Germany | 55/262 |
| 293274 | 2/1981 | Germany | 95/134 |
| 4012982 | 10/1991 | Germany | 95/133 |
| 54-156274 | 12/1979 | Japan | 55/262 |
| 60-012885 | 4/1985 | Japan | 55/262 |
| 62-129122 | 6/1987 | Japan | 55/262 |
| 7611236 | 4/1977 | Netherlands | 55/262 |
| 1501866 | 2/1978 | United Kingdom | 55/262 |

OTHER PUBLICATIONS

Kilgore, J. D. et al; Camden County MWC Carbon Injection Test Results; Paper Presented at the 1993 International Conf. on Municipal Waste Combustion; pp. 1–20.

Felsvang, Karsten et al; Control of Mercury and Dioxin Emissions from European MSW Incinerators by Spray Dryer Absorption Systems; The American Society of Mechanical Engineers; Presented at the Fifth Integrated Environmental Controls for Power Plants Conference, New Orleans, Mar. 4–5, 1991; pp. 1–8.

Casill, Robert P. et al; Air Toxic Control Technologies for Industrial Applications; Air & Waste Management Association; For Presentation at the 84th Annual Meeting & Exhibition, Vancouver, British Columbia, Jun. 16–21, 1991; pp. 1–37.

(List continued on next page.)

*Primary Examiner*—Robert Spitzer
*Attorney, Agent, or Firm*—Flehr, Hohbach, Test, Albritton & Herbert

[57] ABSTRACT

A method for removing pollutants from a combustor flue gas. The method includes the steps of supplying sorbent to a baghouse having a filter bag therein until the filter bag is coated with a predetermined amount of sorbent and introducing the flue gas into the baghouse. Pollutants in the flue gas are sorbed by the sorbent on the filter bag. A system is provided for performing the method of the invention.

11 Claims, 2 Drawing Sheets

OTHER PUBLICATIONS

Miller, Stanley J. et al; Laboratory–Scale Investigation of Sorbents for Mercury Control; Presented at 87th Annual Meeting of the Air & Waste Mangement Association; Jun. 19–24; pp. 1–15, 1994.

Chang, Ramsay et al; Sorbent Injection for Flue Gas Mercury Control; Presented at 87th Annual Meeting of the Air & Waste Mangement Association, Jun. 19–24, 1994; pp. 1–13.

Chang, Ramsay et al; Pilot Scale Evaluation of Activated Carbon for the Removal of Mercury at Coal–Fired Utility Power Plants; Paper Presented at 2nd International Conf. on Manageing Hazardous Air Pollutants; Jul. 13–15, 1993; Washington, D.C. pp. 1–17.

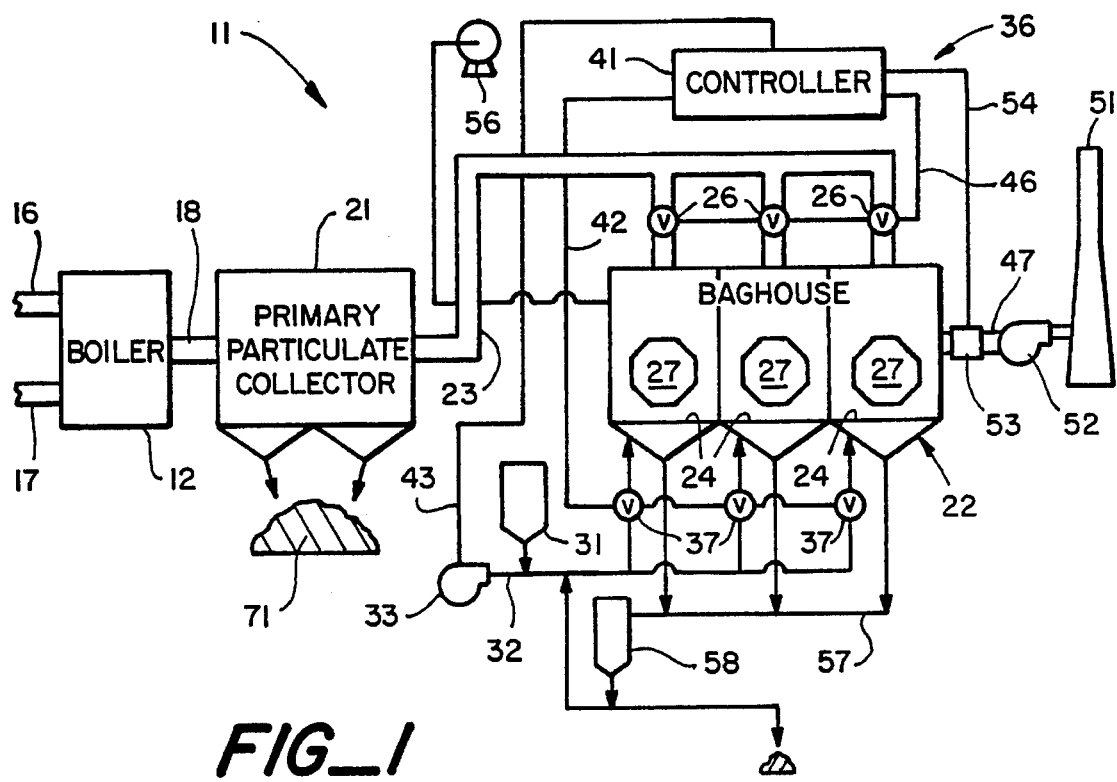
FIG_1
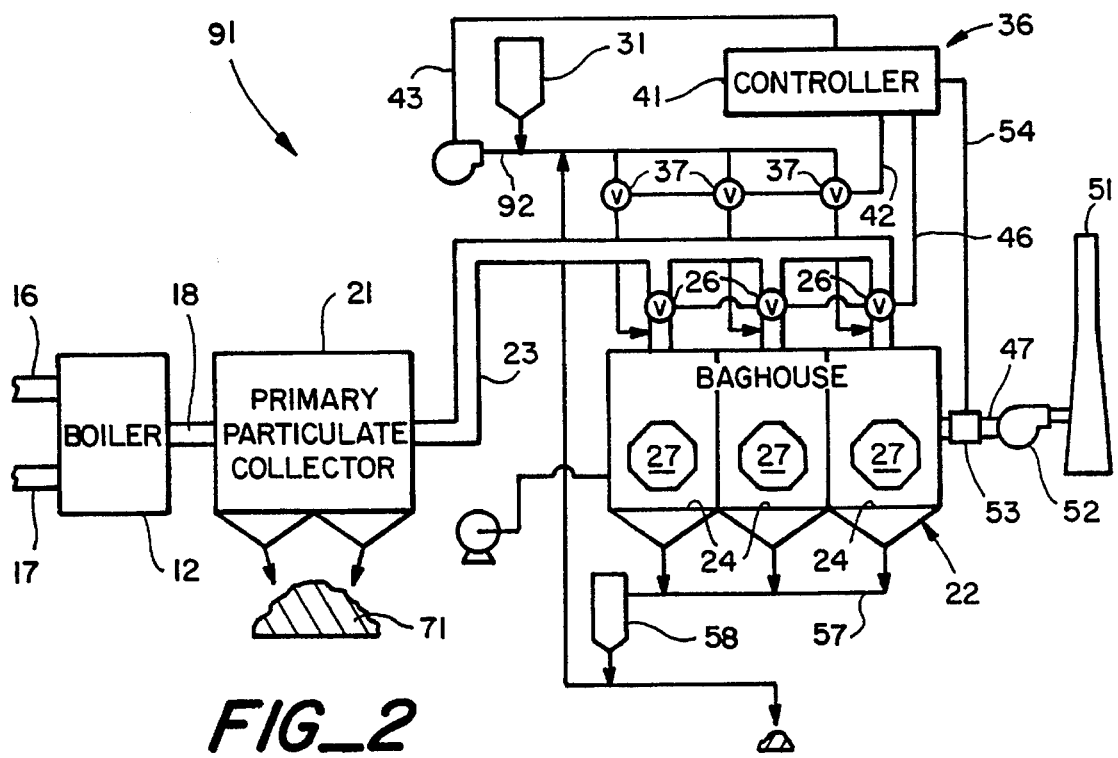
FIG_2

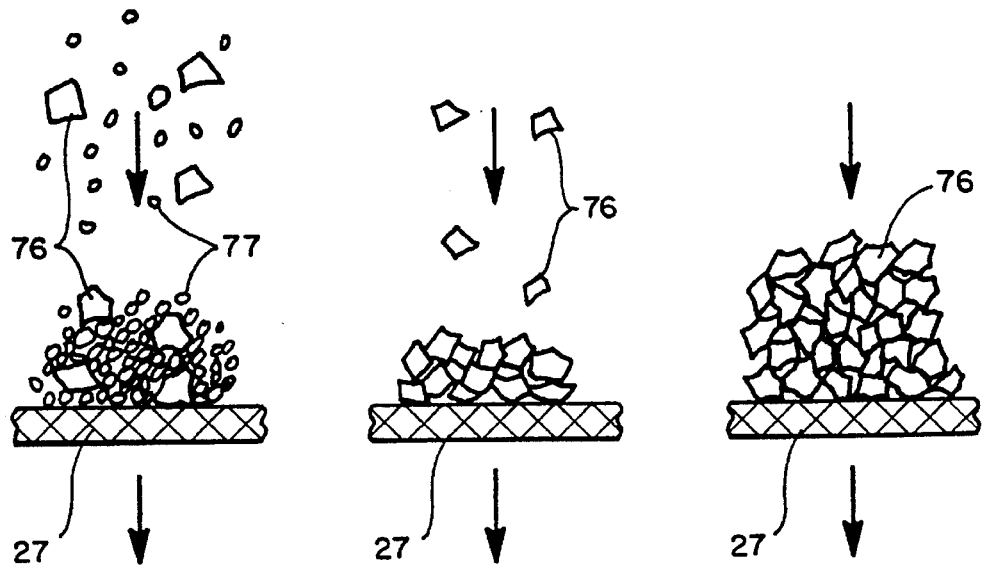
FIG_3A  FIG_3B  FIG_3C
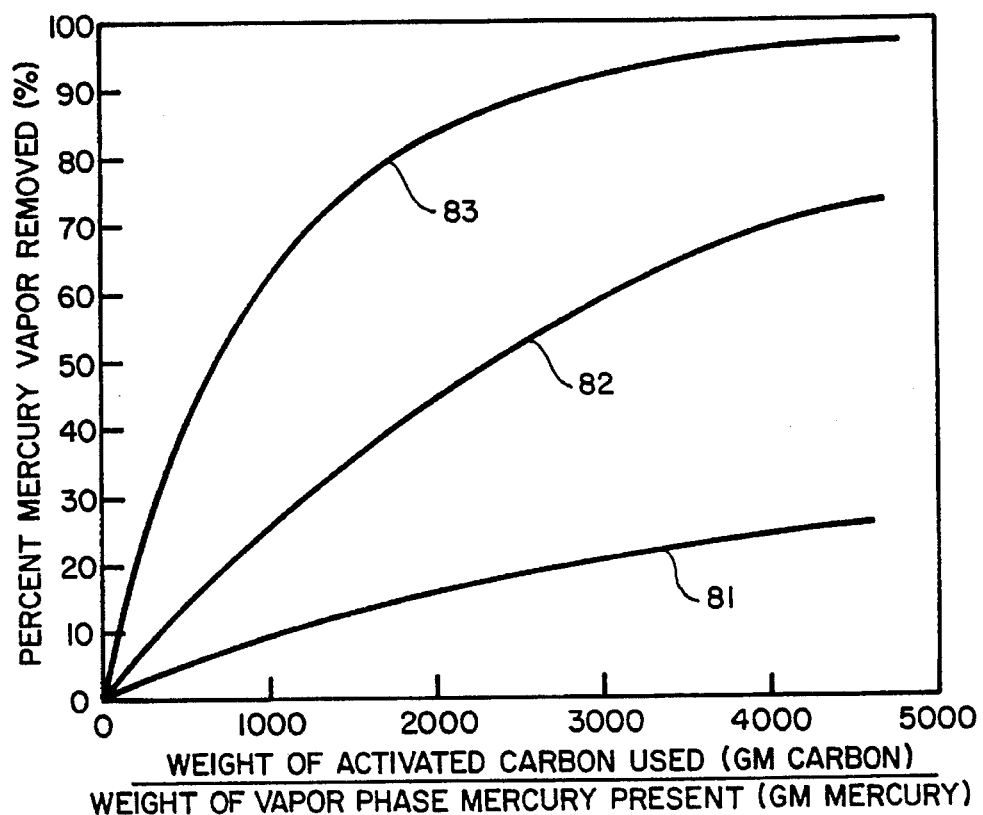
FIG_4

METHOD FOR REMOVING POLLUTANTS FROM A COMBUSTOR FLUE GAS AND SYSTEM FOR SAME

BRIEF DESCRIPTION OF THE INVENTION

This invention relates to the removal of pollutants from an exhaust gas stream of a combustor and more particularly to the removal of trace amounts of vapor phase air toxics such as mercury from the flue gas of a combustion source.

BACKGROUND OF THE INVENTION

The emission of air toxics from combustion sources is an important issue in light of the 1990 Clean Air Act Amendments. Title III of these amendments governs air toxics and, in general, requires major emission sources to control the amount of air toxics emissions to less than 10 tons per year for any one toxic species and less than 25 tons per year for all species. Air toxics are present in the flue gases of combustion sources and appear both as particulate metals, such as nickel, arsenic and chromium, in the fly ash particles and vapor phase metals, such as mercury, selenium and halides and organic vapors.

Trace metals in flue gas are normally concentrated in the fly ash particles and can be removed effectively by an efficient particulate collector such as an electrostatic precipitator or a baghouse. Methods have been provided for removing particulate phase air toxics from the flue gas of a combustion source. For example, Smith et al. (U.S. Pat. No. 4,956,162) discloses a method for removing particulate matter, sulfur dioxide and volatile toxic materials from the flue gas of coal-fired boilers. In general, the process of Smith et al. includes directing the flue gas to an electrostatic precipitator (ESP) for removal of particulate ash and dust from the flue gas. Dry sodium based or calcium based sorbents are blown continuously into the relatively particle-free flue gas between the ESP and a baghouse to react with the sulfur dioxide. The sorbents/sulfur dioxide byproduct and unreacted sorbent are collected on the filter bags of the baghouse where reaction and collection of sulfur dioxide continues to occur. The material collected on the filter bags is removed periodically in a normal fashion.

Another method for filtering fly ash and other particulates from flue gas is described in Chang (U.S. Pat. No. 5,024,681) and includes the steps of passing the gas through an ESP to remove most of the particulates from the flue gas then through a baghouse to remove the remaining particulates. The particulates exiting the ESP are at relatively low concentrations and are charged so as to have lower penetration across the bag filter than uncharged particles. These charged particles also tend to build a dustcake with low flow resistance. The combination of low dust loading, low dustcake flow resistance and low particle penetration allow the relatively compact baghouse downstream of the ESP to operate at high face velocities.

Vapor phase air toxics are present in flue gas in very small concentrations, for example parts per billion to parts per trillion quantities, which are difficult to remove. To date, specially designed and costly emissions-control systems have been required to capture these volatile compounds effectively.

Some of the techniques currently used for removing mercury from gas streams include either injecting sorbents into the gas stream before a particulate collection device, passing the gas stream through a packed bed of sorbent or using a wet system to capture mercury compounds. For example, Smith et al. discussed above provides that if the combustion gas is cooled before entering the baghouse, volatile toxic materials, which are in vapor phase at flue gas temperatures but condense on the fly ash particles at lower temperatures, are removed as well. Injected sorbents are most commonly activated carbons or carbons treated chemically to produce sulfide or iodide compounds with mercury. Packed-bed adsorbers typically use carbon-based materials for collecting mercury. Wet systems involve equipment such as scrubber towers, spray dryers, wet electrostatic precipitators or water-treatment facilities. Work on the removal of mercury from flue-gas streams has involved the use of injected adsorbents and wet chemicals.

In general, these currently provided systems for removing vapor phase air toxics from flue gas require relatively large quantities of sorbent and produce relatively large quantities of hazardous waste. Furthermore, the prior art practice of injecting sorbent continuously into the gas stream to react with air toxics therein has not proven effective since reactions between the sorbent and trace air toxics in the gas stream are limited by mass transfer and kinetic reaction.

OBJECTS AND SUMMARY OF THE INVENTION

The primary object of the present invention is to provide a method and system for removing pollutants such as vapor phase air toxics from the flue gas of a combustor.

A more particular object of the invention is to provide a method and system of the above character for removing vapor phase air toxics such as mercury from the flue gas of a combustor.

Another object of the invention is to provide a method and system of the above character in which reduced quantities of sorbent are required.

Another object of the invention is to provide a method and system of the above character in which reduced quantities of hazardous waste are generated.

Another object of the invention is to provide a method and system of the above character which provides for high vapor phase trace air toxic removal efficiencies by forcing the air toxics species to pass through a thick layer of sorbents so as to provide intimate contact between the sorbent and the air toxics species.

Another object of the invention is to provide a method and system of the above character in which high air-to-cloth ratios are provided so as to permit the pollutant collection system to be relatively compact.

These and other objects are achieved by a method for removing pollutants from a combustor flue gas. The method includes the steps of supplying sorbent to a baghouse having a filter bag therein until the filter bag is coated with a predetermined amount of sorbent and introducing the flue gas into the baghouse. Pollutants in the flue gas are sorbed by the sorbent on the filter bag. A system is provided for performing the method of the invention.

Additional objects and features of the invention will appear from the following description from which the preferred embodiments are set forth in detail in conjunction with the accompanying drawings.

BRIEF DESCRIPTION OF THE DRAWINGS

FIG. 1 is a schematic view of the system for removing pollutants from a combustor flue gas of the present invention.

FIG. 2 is schematic view of another embodiment of the system for removing pollutants from a combustor flue gas of the present invention.

FIGS. 3A–3C are schematic illustrations of sorbent deposition on the surfaces of filter bags in a baghouse.

FIG. 4 is a graph of hypothetical curves, corresponding to the different sorbent deposition patterns on the filter bags illustrated in FIG. 3, depicting the effect of sorbent concentration on mercury vapor removal.

DETAILED DESCRIPTION OF THE INVENTION

Reference will now be made in detail to the preferred embodiments of the invention which are illustrated in the accompanying figures. The description of the embodiments of the invention will be followed by a discussion of their operation.

Pollutant removal system 11 of the present invention is for use with a combustion source such as a fossil-fuel-fired boiler 12 which receives air through air inlet duct 16 to combust fuel such as coal received through fuel inlet duct 17. The combustion process within boiler 12 produces a flue gas which exits the boiler through outlet duct 18. The flue gas produced within the boiler is comprised of components of air, products of combustion in the gaseous form such as water vapor, carbon dioxide, oxides of nitrogen and sulfur, halides, organic compounds, mercury, selenium and other trace metal vapors and particulate matter.

System 11 includes a primary particulate control device or collector 21 such as an electrostatic precipitator or baghouse which is coupled to boiler 12 via outlet duct 18 and a second particulate control device or collector such as baghouse 22 which is situated downstream from primary collector 21 and coupled thereto by connector duct 23. Baghouse 22 is comprised of multiple compartments 24 and is illustrated in FIG. 1 with three compartments 24. Valves 26 are provided in connector duct 23 for governing the flow of flue gases into each of the three compartments 24. Each compartment includes a plurality of filter bags 27, one of which is shown in each compartment 24 in FIG. 1, which range in number from 100 to 4,000 per compartment and range in cross-sectional area from approximately 25 sq. ft. to 100 sq. ft. per bag. The actual number of compartments 24 in baghouse 22 will depend upon the amount of gas to be processed and the number of filter bags 27 in each of the compartments.

Means is provided in system 11 for periodically coating filter bags 27 of baghouse 22 with a slug of sorbent to remove pollutants from the flue gas. This means includes a sorbent silo 31 for holding the sorbent and depositing it into a feed duct 32. A fan 33 serves to force the sorbent through feed duct 32 into the baghouse and coat the filter bags. A control means or system 36 is provided for controlling the amount of sorbent coated onto the filter bags and the periodicity of the recoating of the filter bags and includes a valve 37 in feed duct 32 for each of compartments 24 of the baghouse. A controller 41 is connected to sorbent feed valves 37 by leads or wires 42 and to forced air fan 33 by leads or wires 43 and is programmed to determine when and to which compartments 24 sorbent should be supplied. The controller is further connected by wires 46 to flue gas valves 26 for controlling into which of the compartments in baghouse 22 the flue gas should be introduced.

The flue gas exits baghouse 22 through exit duct 47 to a stack 51, which dispels the flue gas into the atmosphere. An induced draft fan 52 is provided in exit duct 47 for drawing the flue gas through boiler 12, primary collector 21 and compartments 24 of the baghouse. Sensor means in the form of sensor 53 is provided between baghouse 22 and draft fan 52 for analyzing the levels of pollutants within the flue gas emitted by system 11. Controller 41 is connected to sensor 53 by lead or wire 54. Although system 11 is illustrated in FIG. 1 as having a single induced draft fan 52 and sensor 53, it should be appreciated that the system can have a separate draft fan and sensor for each compartment of the baghouse and be within the scope of the present invention.

System 11 includes means for cleaning the used sorbent from filter bags 27 of baghouse 22 which includes compressor 56 for pulsing the filter bags with pulsed air. It should be appreciated, however, that this means can include other well known approaches for filter bag cleaning, including shaking or backflow with reverse air. Sorbent so removed from filter bags 27 falls to the bottom of compartments 24 and exits through drain ducts 57 to hopper 58.

In operation and use, system 11 can be used to remove fly ash particles and trace amounts of vapor phase air toxics such as mercury from the flue gas of boiler 12. The flue gas is directed by outlet duct 18 through primary collector 21 to produce partially cleansed flue gas. Particulate matter such as fly ash particles are removed from the flue gas by the primary collector. At least approximately 90% and preferably 90% to 100% of the fly ash particles are removed from the flue gas by the primary collector. These fly ash particles so removed, identified in FIG. 1 by reference 71, are disposed of and/or further treated in a conventional manner.

Connector duct 23 and flue gas valves 26 are included within the means of system 11 for introducing the partially cleansed flue gas into baghouse 22 for further treatment. As can be appreciated by those skilled in the art, the flue gases entering the baghouse are typically introduced into less than all of compartments 24 of the baghouse. In this regard, the flow of the partially cleansed flue gases into the baghouse is controlled by controller 41 which opens and closes the desired flue gas valves 26. Compartments 24 are periodically taken off-line to clean filter bags 27 therein and dispose of spent sorbent.

Prior to introduction of flue gas into a particular compartment 24, filter bags 27 within the compartment are precoated with a predetermined amount or slug of sorbent from silo 31. The sorbent is supplied to the compartment through feed duct 32 by forced air fan 33. Controller 41 opens the appropriate sorbent valve 37 to permit injection of the sorbent into the compartment. Once the proper quantity of sorbent has been supplied to the filter bags, valve 37 is closed by the controller. A suitable sorbent for the removal of mercury from the partially cleansed flue gas is activated carbon, although other sorbents such as iodide or sulfur impregnated activated carbon, sulfur based sorbents and zeolites can be used and be within the scope of the present invention.

Filter bags 27 in baghouse 22 can be coated with a relatively thick layer of sorbent because a significant portion of the existing particles in the flue gas stream have been removed therefrom by primary collector 21. The amount of mercury sorbent coated on each of the filter bags is a function of several variables, including the ability of induced draft fan 52 to draw flue gas through boiler 22 and all downstream equipment to stack 51. The nominal range of acceptable pressure drop across filter bags 27 of the baghouse ranges from 0.75 to 3 kPa (3 to 12 inches of water). Thus, sufficient sorbent will be added to each filter bag 27 to keep the pressure drop across the filter bag within the nominal pressure drop range when the volume of flue gas filtered per unit filter area per unit time (also defined as air-to-cloth ratio) is 2 to 10 centimeters per second (4 to 20 feet per minute). For most sorbents, this will result in approximately 0.1 to 4 kilograms of sorbent per square meter of filter area.

Once the flue gas has been introduced into the on-line compartments 24 of baghouse 22, the mercury in the flue gas is sorbed by the sorbent on filter bags 27. High mercury adsorption is possible as the flue gas passes through the thick sorbent layer on the filter bags because of the large amount of sorbent present on the filter bags relative to the amount of mercury present in flue gas. The high sorbent to mercury ratios permit intimate contact between the mercury and the sorbent at the filter bags.

FIG. 3C illustrates the build-up on a filter bag 27 of the present invention, which is shown with a relatively thick filter cake of sorbent 76 thereon, in comparison to filter bags of currently available methods for removing pollutants from flue gas illustrated in FIGS. 3A and 3B. FIG. 3A shows a filter bag in a process in which the sorbent is injected directly into the flue gas ahead of a baghouse where most of the fly ash particles have not been removed by a primary particulate collection device. As can be seen, relatively few sorbent particles 76 are scattered amongst fly ash particles 77. The build-up of fly ash particles and sorbent on the filter bag is limited by the size of induced draft fan 52. As a result, the filter bag shown in FIG. 3A must be cleaned before a significant amount of sorbent is permitted to accumulate thereon. In addition, the interaction between the pollutants in the flue gas passing through the bag filter of FIG. 3A and the sorbent thereon is limited because of the relatively low density and concentration of sorbent on the bag filter. FIG. 3B illustrates a filter bag in a process in which the sorbent is injected continuously into a flue gas stream entering a baghouse downstream from a primary particulate collection device for removing fly ash particles from the flue gas. The filter bag of FIG. 3B is periodically cleaned to limit the gradual sorbent accumulation thereon.

The hypothetical curves of FIG. 4 chart the percent of mercury vapor removed against relative concentrations in the baghouse of an activated carbon sorbent and mercury for the methods and system of the present invention and the methods corresponding to the filter bags illustrated in FIGS. 3A and 3B. Curves 81 and 82 correspond to the processes of FIGS. 3A and 3B, respectively. As can be seen from curve 81, the mercury removal effectiveness—that is, the amount of carbon needed per amount of mercury present required to achieve a certain removal efficiency—is very poor since the fly ash dilutes the contact between the mercury vapor and the activated carbon on the filter bag surface and since relatively small amounts of activated carbon can be kept on the filter bags before cleaning of the filter bags due to fly ash and sorbent buildup is required. Curve 82 shows the improvement in mercury removal effectiveness on the filter bag of FIG. 3B over the filter bag of FIG. 3A. Since little or no fly ash is present, more activated carbon sorbent can build up on the filter bag surface of FIG. 3B before cleaning is necessary. However, at any specific time, the amount of sorbent on the filter bag is relatively small so that there is less sorbent to react with the mercury vapor.

Curve 83 illustrates the significant mercury vapor removal percentages for the method of the present invention. The intimate contact between the mercury within the flue gas and the sorbent permitted by the present invention, in comparison to the limited contact at the filter bag of FIG. 3A, and the high ratio of sorbent to vapor phase mercury on the surface of filter bag 27 as illustrated in FIG. 3C, in comparison to the filter bag of FIG. 3B, results in mercury removal percentages significantly higher than currently available methods utilizing gas phase contact.

In the method and system of the present invention, the amount of sorbent on the filter bags is sufficient to remove any predetermined percentage, including from 90% up to 100%, of the mercury present in the flue gas passing through the filter bags. The maximum amount of sorbent is retained on the filter bags throughout each feeding so that these predetermined levels of mercury removal are achieved throughout the operation of the baghouse. These removal levels are attainable at practical and desirable air-to-cloth ratios.

The introduction of flue gas into a compartment 24 of baghouse 22 is stopped when the percentage of mercury being sorbed by the sorbent drops below the predetermined and desired level due Go gradual saturation of the sorbent. It is estimated that this time-to-saturation will range from 10 minutes to 8 hours. Sensor 53 permits the monitoring of the mercury levels in the cleansed flue gas exiting baghouse 22. Controller 41 is programmed so that once the mercury removal level falls below a predetermined amount, the compartment 24 having the saturated layers of sorbent therein is taken off-line and another compartment put into operation by the closing and opening of appropriate sorbent valves 37.

Once a compartment 24 is taken off-line for replenishment, the sorbent is removed from filter bags 27 therein in the manner discussed above and drained to hopper 58. Fresh sorbent is then blown in from sorbent silo 31 to recoat the filter bags of the off-line compartment 24 to the desired thickness. The replenished compartment 24 is then returned to service when needed. As can be appreciated, each of compartments 24 in baghouse 22 can be taken off-line for sorbent replenishment at different times so that the baghouse can continue in operation with the remaining compartments. It should be appreciated that system 11 can be operated without sensor 53 and be within the scope of the present invention. If sensor 53 is not included in the system, controller 41 can be programmed to replenish compartments 24 at a predetermined and acceptable interval.

Baghouse 22 also acts as a final particulate collection device to capture essentially all particulate matter not captured in primary collector 21. The cleansed flue gas from baghouse 22 is dispelled into the atmosphere by stack 51.

System 11 of the present invention overcomes many of the problems of conventional sorbent injection systems for mercury control. The system can achieve relatively high air toxics removal efficiencies for trace vapor air toxics species such as mercury present in flue gas where reactions with sorbents are very slow in the gas phase due to mass transfer and kinetic reaction limitations.

In addition, the system produces reduced quantities of hazardous waste and requires reduced quantities of sorbents because most of the fly ash particles are removed from the flue gas by primary collector 21 before the flue gas interacts with the mercury control sorbent in baghouse 22. Since the fly ash particles drained from primary collector 22 do not contain toxics-laden sorbent, as is the case in many conventional sorbent injection systems, the fly ash particles are not deemed hazardous waste requiring special and expensive disposal. Instead, the nonhazardous fly ash particles can be used in paving roads or as a substitute for portland cement in concrete. The used sorbent collected by baghouse 22 contains few, if any, fly ash particles and are separately disposed of or, in some instances, recycled into the baghouse for reuse. Since many sorbents are quite expensive, the possible reuse of sorbent adds to the cost effectiveness of system 11. Furthermore, as discussed above, the efficient interaction between the thick sorbent filter cake and the mercury pollutants within the flue gas at filter bags 27, as opposed to in the gas atmosphere of the baghouse, significantly reduces the levels of sorbents required in the process of the present invention over currently available mercury removal techniques.

As an example of the operating efficiency of system 11, it has been calculated that a hypothetical 500 megawatt plant having no mercury control produces approximately 7,500 tons of fly ash per year which can be disposed of as a non-hazardous material. When this same plant is modified to inject sorbent upstream of the particulate collector for mercury capture, the plant now generates approximately 8,150 tons per year of mercury contaminated fly ash which requires disposal as a hazardous waste. In contrast, the incorporation of system 11 into this hypothetical plant and the recycling of sorbent permitted thereby reduces the amount of mercury-contaminated material to approximately 65 tons per year and returns the plant to producing approximately 7,500 tons of unhazardous fly ash material.

Baghouse 22 of system 11 can be operated at air-to-cloth ratios considerably above conventional practice since a significant portion of the existing particles in the flue gas stream is removed in primary collector 21 and the amount and properties of the sorbent on filter bags 27 can be controlled so that the overall pressure drop across the filter bag is within the operation limits of induced draft fan 52. These increased air-to-cloth ratios permit baghouse 21 to be approximately two to four times smaller than baghouses utilized in conventional designs.

Although system 11 has been described and shown in use with a fossil-fuel-fired boiler 12, it should be appreciated that the system can be incorporated into any process requiring gas stream vapor and particulate air toxics clean up. The system of the present invention is particularly suitable for combustion facilities already having a moderate to high efficiency particulate collection device. For example, system 11 could be incorporated into metallurgical processes, municipal waste incinerators, cement kilns and hazardous waste incinerators. In addition, system 11 can be utilized to remove vapor phase air toxics other than mercury and be within the scope of the present invention. For other vapor phase air toxics species such as organic vapors, halides and selenium, sorbents effective for these species can be used alone or in combination to achieve multiple vapor air toxics species control.

The method and system of the present invention can have other embodiments. For example, system 91 illustrated in FIG. 2 is substantially similar to system 11 and like reference numerals have been used in FIG. 2 to identify like components of systems 11 and 91. System 91 differs from system 11 in that the sorbent is injected directly into the flue gas contemporaneously with the introduction of the flue gas into baghouse 22. More particularly, feed duct 92 supplies the sorbent from silo 31 into connector duct 23 downstream of flue gas valves 26 under the force of air fan 33. The rate of injection of the sorbent into the on-line compartment(s) is such that filter bags 27 therein are coated with the desired amount of sorbent during a period ranging from 0.1 to 5.0 minutes and preferably from 0.2 to 2.0 minutes. After the desired amount of sorbent has been applied to the filter bags, the supplying of sorbent is discontinued and the sorbent deposited on the filter bags is allowed to continue to react with the mercury in the flue gas.

Although the embodiments of the invention discussed above provide for the supplying of a predetermined amount of sorbent to filter bags 27 in baghouse 22 before the supply of sorbent is stopped, it should be appreciated that a system and method in which sorbent is continuously injected with the flue gas after the introduction of the predetermined amount of sorbent has been provided to the filter bags would be within the scope of the present invention.

From the foregoing, it can be seen that a method and system for removing pollutants such as vapor phase air toxics from the flue gas of a combustor has been provided. The method and system, which can be utilized for removing mercury from the flue gas of a combustor, requires reduced quantities of sorbent from currently available methods and systems and generates less hazardous waste than these currently available methods and systems. The method and system of the present invention provides for high vapor phase trace air toxic removal efficiencies by forcing the air toxics species to pass through a thick layer of sorbents so as to provide intimate contact between the sorbent and the toxic species. High air-to-cloth ratios are provided so as to permit the pollutant collection system to be relatively compact.

What is claimed is:

1. A method for removing vapor phase air toxics from a combuster flue gas having fly ash particles therein comprising the steps of directing the flue gas through a particulate control device to remove fly ash particles from the flue gas, supplying sorbent to a baghouse having a filter bag therein until the filter bag is coated with a layer having a predetermined amount of sorbent and introducing the flue gas into the baghouse, the supplying step providing a high ratio of sorbent to vapor phase air toxics on the filter bag during the introducing step for facilitating intimate contact between the sorbent and the vapor phase air toxics on the filter bag and thus enhancing the sorbing of vapor phase air toxics from the flue gas.

2. The method of claim 1 for removing mercury from flue gas wherein the introducing step includes introducing the flue gas into the baghouse so that mercury is sorbed by the sorbent.

3. The method of claim 1 wherein the supplying step occurs prior to the introducing step.

4. The method of claim 1 further comprising the steps of ceasing the introduction of flue gas into the baghouse once the percentage of vapor phase air toxics being sorbed by the sorbent drops below a predetermined level, removing the sorbent from the filter bag, supplying additional sorbent to the baghouse until the filter bag is recoated with a predetermined amount of sorbent and introducing additional flue gas into the baghouse.

5. The method of claim 4 wherein the ceasing step includes ceasing the introduction of flue gas into the baghouse after the flue gas has been flowing through the baghouse for a period of time ranging from ten minutes to eight hours.

6. The method of claim 1 wherein the supplying step includes coating the filter bag with 0.1 to 4.0 kilograms of sorbent per square meter of filter area.

7. A method for cleansing a combuster flue gas having fly ash particles and mercury therein comprising the steps of directing the flue gas through a particulate control device to remove fly ash particles from the flue gas and produce a partially cleansed flue gas, discharging the removed fly ash particles from the particulate control device, supplying sorbent to a baghouse having a filter bag therein to provide a sorbent coated filter bag having an air-to-cloth ratio of at least 2 cm/sec and a pressure drop thereacross ranging from 0.75 to 3 kPa and introducing the partially cleansed flue gas into the baghouse to remove the mercury from the flue gas as the flue gas passes through the coating of sorbent on the filter bag, the supplying step providing a high ratio of sorbent to mercury on the filter bag during the introducing step whereby the removal of fly ash particles prior to the interaction of the flue gas with the sorbent facilitates disposal of the removed fly ash particles and reuse of the sorbent and the coating of the filter bag so that the filter bag has a high ratio of sorbent to mercury facilitates intimate contact between the sorbent and the mercury on the filter bag and thus enhances removal of the mercury from the flue gas during the introducing step.

8. The method of claim 7 wherein the introducing step occurs contemporaneously with the supplying step.

9. The method of claim 8 wherein the supplying step extends over a period of time ranging from 0.1 to 5.0 minutes.

10. The method of claim 7 wherein the directing step includes removing at least approximately 90% of the fly ash particles from the flue gas.

11. The method of claim 7 wherein said air-to-cloth ratio is in the range of 2 to 10 cm/sec.

\* \* \* \* \*